(12) United States Patent
Jung

(10) Patent No.: US 9,055,199 B2
(45) Date of Patent: Jun. 9, 2015

(54) AUTOFOCUS CAMERA SYSTEM AND CONTROL METHOD THEREOF

(75) Inventor: Sung Ho Jung, Yeonsu-gu (KR)

(73) Assignee: HDC INC., Incheon (KR)

( * ) Notice: Subject to any disclaimer, the term of this patent is extended or adjusted under 35 U.S.C. 154(b) by 10 days.

(21) Appl. No.: 14/119,255

(22) PCT Filed: Oct. 13, 2011

(86) PCT No.: PCT/KR2011/007613
§ 371 (c)(1),
(2), (4) Date: Jan. 14, 2014

(87) PCT Pub. No.: WO2012/161384
PCT Pub. Date: Nov. 29, 2012

(65) Prior Publication Data
US 2014/0125859 A1 May 8, 2014

(30) Foreign Application Priority Data
May 23, 2011 (KR) .................. 10-2011-0048402

(51) Int. Cl.
*H04N 5/232* (2006.01)
*H04N 7/18* (2006.01)

(52) U.S. Cl.
CPC ............ *H04N 7/18* (2013.01); *H04N 5/23212* (2013.01); *H04N 5/23296* (2013.01); *H04N 7/183* (2013.01)

(58) Field of Classification Search
CPC .. H04N 5/23212; H04N 5/23296; H04N 7/18
See application file for complete search history.

(56) References Cited

U.S. PATENT DOCUMENTS

2005/0055727 A1* 3/2005 Creamer et al. .............. 725/105
2011/0310219 A1* 12/2011 Kim et al. ...................... 348/36

FOREIGN PATENT DOCUMENTS

| JP | 2008-076954 A | 4/2008 |
| KR | 10-2006-0100966 A | 9/2006 |
| KR | 10-0998408 B1 | 12/2010 |

OTHER PUBLICATIONS

International Searching Authority, International Search Report of PCT/KR2011/007613 dated Apr. 9, 2012.

* cited by examiner

*Primary Examiner* — James Hannett
(74) *Attorney, Agent, or Firm* — Sughrue Mion, PLLC

(57) ABSTRACT

Disclosed is an autofocus camera system and a control method thereof. A CCTV camera system which includes a main processor installed in a CCTV, a memory unit connected with the main processor, an input unit, a CCD camera, a video processing unit, a focus lens, and a zoom lens is provided. The CCTV camera system is designed to input and output control instructions through RS-485 communication and is controlled by a focus motor driver and a zoom motor driver which are connected to the main processor in which a focus motor and a zoom motor are comprised of stepping motors.

6 Claims, 3 Drawing Sheets

AUTOFOCUS CAMERA SYSTEM AND CONTROL METHOD THEREOF

CROSS REFERENCE TO RELATED APPLICATIONS

This is a National Stage of International Application No. PCT/KR2011/007613 filed Oct. 13, 2011, claiming priority based on Korean Patent Application No. 10-2011-0048402 filed May 23, 2011, the contents of all of which are incorporated herein by reference in their entirety.

TECHNICAL FIELD

The present invention relates to autofocus camera system and its control method. More specifically, it pertains to division of focus function and the zoom function in order for each of them to move through different power source thereby implementing an autofocus through ⅓" Charge Coupled Device henceforth known as CCD in the CCTV camera and controlling the drive of the zoom and autofocus through each of the stepper motors to enable the auto focusing and zoom function in CCTV in order to decrease the operation time, increase the efficiency as well as the auto correction function which are all included in the present invention of autofocus camera system and control method thereof.

BACKGROUND ART

Closed Circuit Television, more commonly referred to as the CCTV system is widely known and used for surveillance, management and for different types of transportation. In most recent development, CCTV systems are being installed in department stores, banks, exhibition centers as well as surrounding area near the schools and residential areas among others for securing safe environment against crime. The outlook predicts that CCTV system will be even more widespread in the near future.

CCD cameras are frequently used in CCTV system in order to take picture of the images.

It is to be noted that CCD is the abbreviation for solid state image sensor wherein photoelectric conversion sensor with the size of 6 mm by 4 mm that has the photoelectric part that changes the light into electric signal and the transmission part that sends the charged electricity that was stored after the conversion.

Basic principle of the conversion sensor is that the light intensity is first recorded in CCD which operates in the same way that the film does in optic camera. Simultaneously, photographed light will be divided into different colors by the RGB filter attached to CCD.

After this, colors that are divided change into electric signals from thousands of light sensor that form the CCD. Analog signal from the CCD is converted to digital signal of either 0 or 1, thus creating a video signal and manifested on the screen. In case of digital camera with 41 thousand pixels, there are 41 thousand light sensors per one CCD.

However, early CCD cameras didn't have zoom function that controls the magnification of the lens unlike the regular optics camera. This caused inconvenience in the sense that the early CCD cameras could only photograph images with fixed ratio.

Most of the latest CCD cameras in the market have zoom and focusing functions and number of other related patented technologies as well.

To provide specific examples of technologies as mentioned above, regulating ring is rotated from the back of camera housing which in turn controls the gear, lens focus and gear in the zoom area as the spur gear type, regulating ring is rotated from top of the camera housing which in turn controls the gear, lens focus and gear in the zoom area as the helical gear type, controlling the lens focus and zoom by rotating the housing on side of the housing where the housing is disassembled without the gear to assemble the lens part, and adjusting the focus and zoom by using the motor through the method of installing the motor in the housing.

However, this type of structure has various drawbacks and limitations in manufacturing and installation process as it makes the size of the CCTV camera bigger. 6 millimeter sized CCD cameras that have auto-focusing function came out in the market. In case of board camera, 4 millimeter sized CCD cameras are used as well.

There is a disadvantage in the sense that the structure and the control becomes complicated as one motor processes both auto focusing and zoom function in order to make the CCD cameras smaller. Not only this, but it also takes longer time to process and focusing function failing to work in certain zoom ratio. When one motor is used, units for zoom and focusing function has to be set manually when one motor is used as it becomes more difficult, complicated, hard to control and takes longer time to process.

Moreover, signal processing function in pre-existing CCTV has to convert back and forth from analog signal and digital signal through one channel which causes overload when processing user interface and video signal and increase of memory that makes it difficult for effective control.

In addition, errors that occur regarding autofocus function cannot be fixed nor verified in pre-existing CCTV wherein it is considered as a limitation.

SUMMARY OF INVENTION

Technical Problem

Accordingly, the present invention has been made in view of the above-mentioned problems occurring in the prior art, and it is an object of the present invention to provide autofocus camera system and the control thereof wherein 4 millimeter sized CCD cameras that are being used in various types of board cameras to provide rapid autofocus and zoom function in the CCTV wherein two stepper motors which secures two channels that can separate user interface and video signal processing that increases efficiency and controlling function, wherein it also has error verification and modification function for clearer and accurate images.

Solution to Problem

To accomplish the above object, autofocus camera system with auto focusing function that makes use of luminance and contrast wherein it is composed of main processor within the CCTV, memory unit connected to the main processor, input unit that provide user interface connected to the main processor, output unit that shows the content that had been processed in the main processor, CCD camera that take photograph of the subject, video processing unit that converts analog signal that have been taken from the CCD camera to digital signal to be sent to the main processor, zoom and focus lens that have been prepared in order to carry out the focus function while taking picture of the object wherein the images are zoomed in or zoomed out; main processor that had been mentioned above is connected to RS-485 transceiver which is built to receive or give out control command through RS-485 communication; above mentioned focus and zoom lens are controlled by independently placed motors in each one that are connected to the main processor that are made from stepper motors; image that had been filmed by CCD does not go through video processing unit but goes to BNC connector and shown to the user to CVBS by analog signal; digital signal that had been converted in the image processing center will be stored in the memory unit to be used as location information with the autofocus; focus motor drivers that are divided into several units according to the size of the lens move to focus points that are divided into units where it carries out the auto focusing function that had been previously mentioned.

Then, the main processor is connected to the MTF calculation unit and focus error detection unit. Focus error detection unit refers to the value of MTF for lenses which are calculated by MTF calculation unit in order to detect the focus related errors and modify them.

Moreover, input unit is provided with focus initialization button to be used when focus function error occur form the main processor.

Further, autofocus camera system and the control method thereof is provided wherein return to the starting point stage where the coordinates of the focus motor returns or maintained to the home position when power is energized or the system is rebooted; calculation stage is when image displacement occurs by the request of the user or through the zoom function, main processor that got the image from the CCD camera from the displaced location calculates the average value of the luminance which are from the various points in the recorded images; movement by unit stage is where focus motor driver controls the movement of focus motor in order to move the focus lens into the nearby unit of the average luminance and contrast that had been calculated by referencing the Look Up Table henceforth known as LUT (Look UP Table) which is stored in the memory unit; control stage is when the focus motors are rotated each in clockwise and counter clockwise direction to get each image in the moved number of steps by basing it on the unit; adjustment stage where contrast ratio is calculated from each image; focus stage wherein main processor compares two contrast ratios after the adjusting stage and winding the focus motor that had been rotated according to the set number of times of the steps towards where contrast is greater to adjust the focus; and focus completion stage where average value of luminance and contrast ratio is calculated to store it to the memory unit after the focus has been set.

In this case when contrast level which moved clockwise is greater than the contrast level that had been moved counterclockwise after the comparison during the focus stage, focus motor is rotated in counterclockwise direction to basic number of steps and wind it clockwise again until the point where change in luminance does not happen and set the focus starting from that point.

Advantageous Effects of Invention

According to the present invention, autofocus function is utilized in CCTV camera with ⅓" CCD camera where zoom and autofocus can be controlled through stepper motor for each of them which in turn makes it possible to operate it smoothly; two channels are used to separate user interface and video signal in order to increase overall operation and control efficiency wherein autofocus related errors can be verified and edited independently; effects such as rapid response to various command lists such as zoom in/out, return to the starting point can be expected through RS-485 communication method.

BEST MODE

So that the manner in which the above recited aspects are attained and can be understood in detail, a more particular description of embodiments of the invention, briefly summarized above, may be had by reference to the appended drawings.

Figure 1:
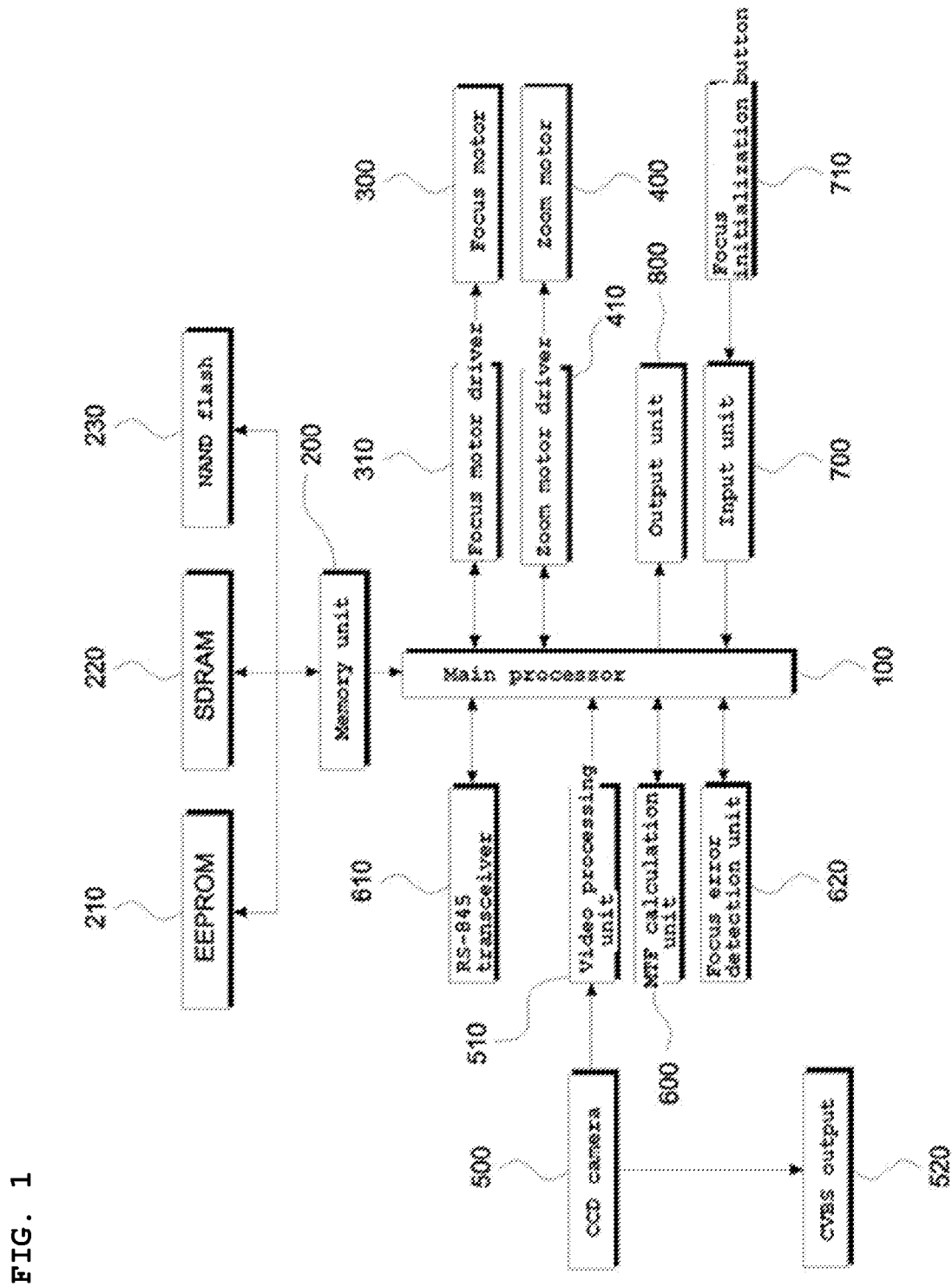
FIG. 1 is a block diagram that depicts the autofocus camera system according to the present invention.

FIG. 1 is a block diagram that depicts the autofocus camera system according to the present invention.

As depicted in FIG. 1, autofocus camera system according to the present invention includes a main processor 100.

Main processor as mentioned above is the chipset that carries out the overall function such as auto focusing, zoom in, zoom out, focus error detection and correction, RS-485 communication, MTF (Modulation Transfer Function) among others for CCTV system.

Further, memory unit is connected to main processor 100 wherein it saves and renews the data under the control of the main processor 100 as it is equipped with EEPROM 210, SDRAM 220, and NAND flash 230 among others.

Further, present invention separately installs the focus motor 300 for autofocus (AF) and the lens zoom motor that controls zooming in and out. For increased efficiency and accurate control, all of them use stepper motors.

Moreover, main processor 100 each has focus motor driver 310 and zoom motor driver 410 and through them, focus motor 300 and zoom motor 400 is controlled.

Above mentioned focus motor driver 310 and zoom motor driver 410 provide the autofocus function as part of their control through each lens (3-16 mm, 5-50 mm varifocal lens) that are used in the CCD camera 500 where MTF calculation unit which is connected to the main processor 100 as the focus and the zoom is moved.

MTF calculation unit 600 calculates the number which is derived from optics function of the lens within the CCD camera 500 and stores the MTF value of each lens to the memory unit 200.

MTF calculation unit 600 is especially designed to locate the errors in the autofocus and correct it.

Further, auto focusing can be controlled easily after the lens have moved by making use of the focus zone which compares the contrast ratio in four outermost edges of the focus center contrast images.

For this, lenses have been designed to move according to units to be controlled by the driver as it had been previously explained. For instance, in case of 3-16 mm lens, it has been built so that six (6) stages of unit movement is possible which is 5.25 times more than the optical and in case of 5-50 mm lens, there are eleven (11) stages of unit movement which is ten times more than the optical.

As such, points in the unit where rapid movement is possible are made into LUT (Look Up Table) to be stored in the memory unit 200. Then, the focus lens can be quickly moved to the unit that fits the position of the zoom lens and time that it takes to focus can be decreased when fine tuning process had been completed afterwards.

Accordingly, when the command regarding zoom and focus has been given out, focus motor driver 310 and zoom motor driver 410 will step each of their focus motor 300 and zoom motor 400 wherein auto focusing will take place when it reaches the corresponding area when zoom in and out function had been carried out through point comparison method which will be explained in detail below.

Further, home position of the stepper motors that are operated by drivers mentioned above are provided in set value. When focusing or zoom error occurs, it is designed to move to the home position; movement of the lens is calculated based on the home position.

Home position as mentioned above is always the basis for when the camera is turned on and booted or when the user pressed the initialization button for initialization.

Moreover, auto focusing and zoom in and out function is controlled by RS-485 communication device and for this, the main processor 100 is connected to RS-485 transceiver 610 that enables RS-485 communication.

In this case, RS-485 communication can be designed to be controlled through Pelco-D or P Protocol.

Moreover, the images are taken so that it could be distinguished whether the focus related function of the auto focus feature. Center of the screen is given the value of 1 point and four corners can each be 1 point which makes 5 points the maximum value. With this, contrast ratio is compared and deciphered. It is recommended that accuracy and the speed of the focusing function would be increased through deciphering with the average value.

Also, the main processor 100 is connected with focus error detection unit 620 which gathers the information regarding the value of actual movement of the auto focusing and zooming in and out function also in order to figure out MTF value saved in memory unit 200 to see if they match to check for focus function related errors.

There are various reasons why focus related errors could happen; wherein in this case, it is designed so that re-focusing can occur after it moved to home position automatically to modify the errors.

Further, it is recommended that CCD camera 500 with the size of ⅓" that are usually used as bot cameras in the present invention so that it may lessen the volume as small as possible. In CCD camera 500 as mentioned above, there are video processing units 510 and CVBS (Composite Video Baseband Signal) output 520 so that it can process the image signal that had been recorded through two channels.

The video processing unit 510 is connected to video terminal of the main processor 100 where analog image recorded from the CCD camera 500 is converted to digital image, sent to the main processor 100 and used as data for auto focusing wherein the data that had been sent is stored to memory unit 200.

Further, CVBS output 520 is connected through CCD camera 500 and BNC (Bayonet-Neil-Concelman) connector and provides the output so that the user can see the analog image without digital conversion.

As such, inconvenience such as having to convert the recorded images through one channel from analog to digital signal or from digital signal to analog for image can be avoided. Image distortion and loss can be avoided as well.

Moreover, main processor 100 has the input unit 700 and output unit 800 that shows the processed information. Especially, on the input unit 700, there is a button provided for focus initialization button 710 for the input unit.

Autofocus will be explained in detail in reference to FIG. 2.

Figure 2:
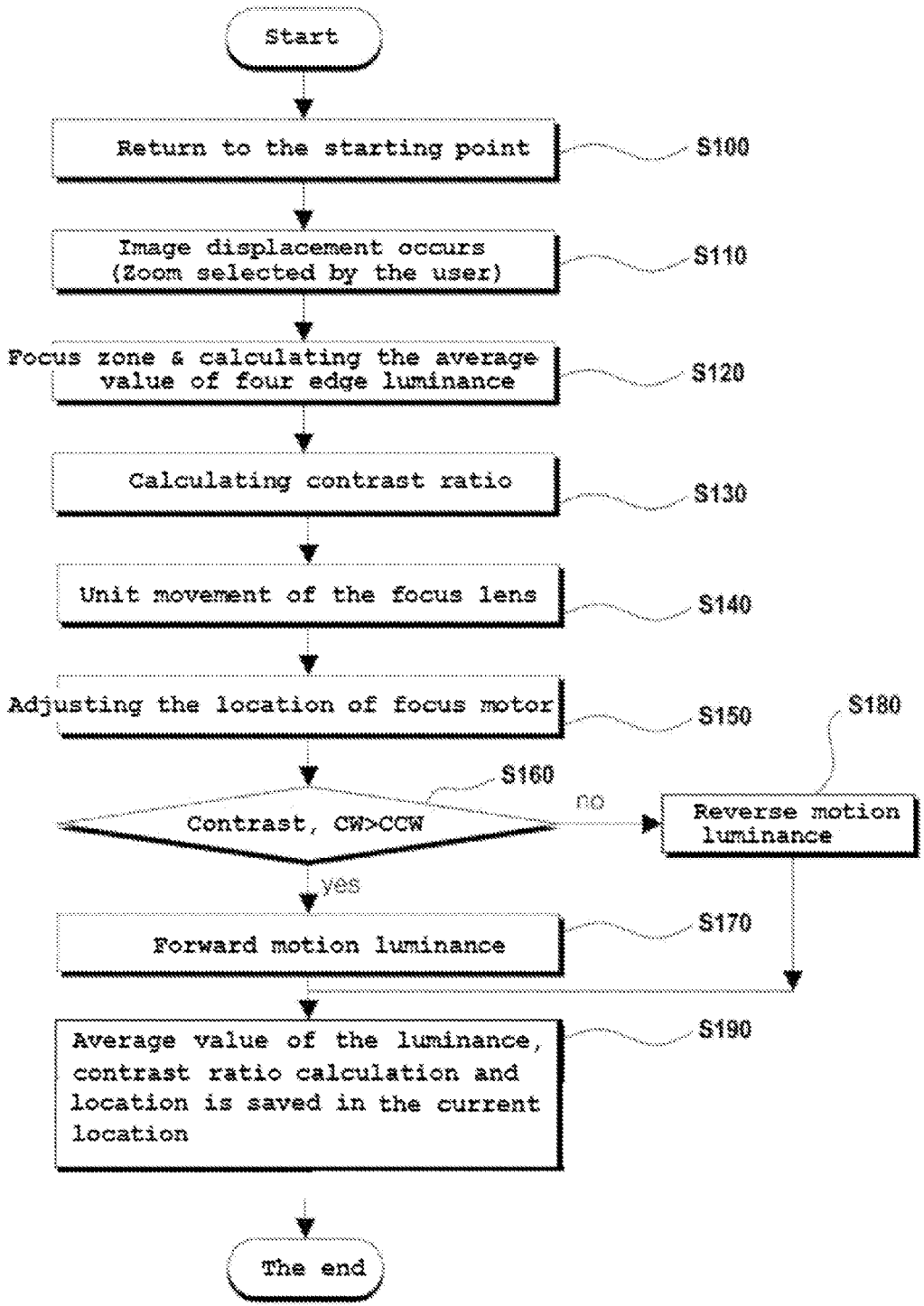
FIG. 2 is a flowchart that provides an example of autofocus control as one of the control methods of autofocus camera system according to the present invention.

As seen on FIG. 2, method of auto focusing control starts from 'return to the starting point' S100 wherein coordinate of the focus motor 300 returns to the home position when the power starts up or system is booted.

For the next step, when the image displacement occurs S110, main processor 100 that has the image from CCD camera 500 calculates the average value of luminance S120 for the image with 1 point of focus center and four points of the edge through MTF calculation unit 600.

Then, contrast ratio is calculated from the image S130, and focus motor driver 310 controls the movement of focus motor 300 by referencing the LUT (Look Up Table). Unit movement stage S140 is carried out where focus lens is moved to the closest unit to average luminance and contrast ratio. For example, 3-16 mm lens is divided into 6 stages and in case of 5-50 mm lens, it is divided into 11 stages wherein the division is based on average luminance and contrast ratio.

Afterwards, focus motors 300 are rotated clockwise and counter clockwise direction to get the images in the moved number of steps by basing it on the unit; adjusting stage where contrast ratio is calculated from the images; focus motor is rotated in clockwise direction to basic number of steps and winded in clockwise direction again until the point where change in luminance does not happen and set the focus starting from that point. This is the adjustment stage S150. From this state, main processor 100 compares the two contrast ratios that had been calculated and this is the comparison stage S160.

When contrast level which moved clockwise is greater than the contrast level that had been moved counterclockwise after the comparison from the comparative stage S160, focus motor is rotated in counterclockwise direction to basic number of steps and winded in clockwise direction again until the point where change in luminance does not happen and set the focus starting from that point. This is the forward motion luminance focus stage S170.

On the other hand, when contrast level which moved counterclockwise is greater than the contrast level that had been moved counterclockwise after the comparison from the comparative stage S160, focus motor 300 is rotated in counterclockwise direction to basic number of steps and winded in counterclockwise direction again until the point where change in luminance does not happen and set the focus starting from that point. This is the reverse motion luminance focus stage S180.

When the focus is set in this manner, focus completion stage S190 is carried out as average value and contrast ratio is calculated to be stored in the memory unit 200.

In this manner, auto focusing time can be shortened by moving the unit according to the location of the zoom and setting the detailed focus by luminance and contrast wherein multiple numbers of stages have been set according to the lens.

Moreover, errors can be found out easily through MTF value and automatically correct it.

Figure 3:
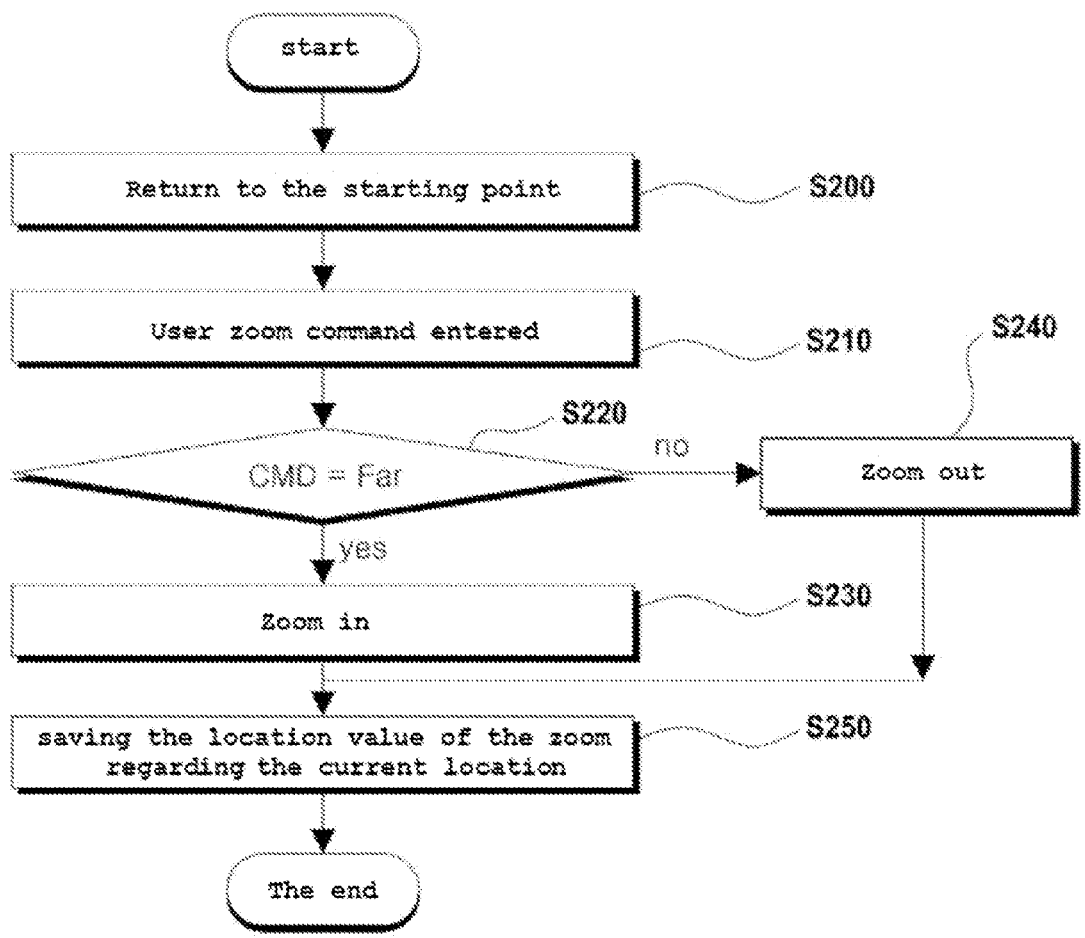
FIG. 3 is a flowchart that provides an example of zoom control as one of the control methods of autofocus camera system according to the present invention.

On the other hand, control method according to the zoom in and out which effects the image displacement as FIG. 3.

As seen on FIG. 3, controlling zoom in and out function starts from the focus motor returns or maintained to the home position when power is energized or the system is rebooted which is the return to the starting point stage S200.

After which where zoom factor had been put in, S210, input value CMD decides if whether to increase the image or to lessen it S220.

For instance, when it is decided that image should be magnified where the object would be closed up by zoom in, zoom motor driver 410 rotates the zoom motor 400 so that the zoom in function works and rotates S230, S240 so that zoom motor 400 would zoom out.

And as this zoom in and out displaces the image during auto focus, it does have an effect and regarding this is as it was said.

As it had been stated, auto focus camera system according to the present invention and the control method thereof can carry out the auto focus function with zoom in and out in a short amount of time accurately wherein the error related to focus can be found and corrected, processing the signal is divided into two channels wherein the control is efficient and accurate that also provides the advantage of increased efficiency.

EXPLANATION OF THE SIGNS

100: Main processor 200: Memory unit
300: Focus motor 400: Zoom motor
500: CCD camera 600: MTF calculation unit
700: Input unit 800: Output unit

What is claimed is:

1. An autofocus camera system, comprising: A main processor within the CCTV, memory unit connected to the main processor, input unit that provide user interface connected to the main processor, output unit that shows the content that had been processed in the main processor, CCD camera that take photograph of the subject, video processing unit that converts analog signal that have been taken from the CCD camera to digital signal to be sent to the main processor, zoom and focus lens that have been prepared in order to carry out the focus function while taking picture of the object wherein the images are zoomed in or zoomed out; main processor that had been mentioned above is connected to RS-485 transceiver which is built to receive or give out control command through RS-485 communication; above mentioned focus and zoom lens are controlled by independently placed motors in each one that are connected to the main processor that are made from stepper motors; image that had been filmed by CCD does not go through video processing unit but goes to BNC connector and shown to the user to CVBS by analog signal; digital signal that had been converted in the image processing center will be stored in the memory unit to be used as location information with the autofocus; focus motor drivers that are divided into several units according to the size of the lens move to focus points that are divided into units where it carries out the auto focusing function as one of the characteristics of the autofocus camera system.

2. The autofocua camera system of claim 1, wherein the main processor is connected to the MTF calculation unit and focus error detection unit and focus error detection unit refers to the value of MTF for lenses which are calculated by MTF calculation unit in order to detect the focus related errors and modify the errors as one of the characteristics of the autofocus camera system.

3. The autofocua camera system of claim 1, wherein the input unit is provided with focus initialization button to be used when focus function error occur form the main processor for initialization as one of the characteristics of the autofocus camera system.

4. The autofocua camera system of claim 1, wherein the autofocus camera system and the control method thereof is provided wherein return to the starting point stage where the coordinates of the focus motor returns or maintained to the home position when power is energized or the system is rebooted; calculation stage is when image displacement occurs by the request of the user or through the zoom function, main processor that got the image from the CCD camera from the displaced location calculates the average value of the luminance which are from the various points in the recorded images; movement by unit stage is where focus motor driver controls the movement of focus motor in order to move the focus lens into the nearby unit of the average luminance and contrast that had been calculated by referencing the Look Up Table henceforth known as LUT (Look UP Table) which is stored in the memory unit; control stage is when the focus motors are rotated each in clockwise and counter clockwise direction to get each image in the moved number of steps by basing it on the unit; adjustment stage where contrast ratio is calculated from each image; focus stage wherein main processor compares two contrast ratios after the adjusting stage and winding the focus motor that had been rotated according to the set number of times of the steps towards where contrast is greater to adjust the focus; and focus completion stage where average value of luminance and contrast ratio is calculated to store it to the memory unit after the focus has been set as one of the characteristics of the autofocus camera system and the control thereof.

5. The autofocua camera system of claim 4, wherein the stage is where focus motors are rotated clockwise and counter clockwise direction to get the images in the moved number of steps by basing it on the unit; adjusting stage where contrast ratio is calculated from the images; focus motor is rotated in clockwise direction to basic number of steps and winded in clockwise direction again until the point where change in luminance does not happen and set the focus starting from that point as one of the characteristics of the autofocus camera system and the control thereof.

6. The autofocua camera system of claim 4, wherein the contrast level which moved clockwise is greater than the contrast level that had been moved counterclockwise after the comparison from the comparative stage, focus motor is rotated in counterclockwise direction to basic number of steps and winded in clockwise direction again until the point where change in luminance does not happen and set the focus starting from that point as one of the characteristics of the autofocus camera system and the control thereof.

* * * * *